(12) United States Patent
Mayberry et al.

(10) Patent No.: US 11,308,051 B1
(45) Date of Patent: Apr. 19, 2022

(54) TOUCHLESS HARVESTING SYSTEM AND METHOD

(71) Applicant: Trym, Inc., Novato, CA (US)

(72) Inventors: Matthew Mayberry, Novato, CA (US); Jesus Mendoza, Seattle, WA (US)

(73) Assignee: TRYM, INC., Novato, CA (US)

( * ) Notice: Subject to any disclaimer, the term of this patent is extended or adjusted under 35 U.S.C. 154(b) by 0 days.

(21) Appl. No.: 17/343,091

(22) Filed: Jun. 9, 2021

Related U.S. Application Data

(60) Provisional application No. 63/112,388, filed on Nov. 11, 2020.

(51) Int. Cl.
| | |
|---|---|
| *G06F 16/22* | (2019.01) |
| *G06F 16/51* | (2019.01) |
| *G06F 16/61* | (2019.01) |
| *G01G 17/00* | (2006.01) |
| *G01G 23/18* | (2006.01) |
| *G10L 15/22* | (2006.01) |
| *H04W 4/80* | (2018.01) |

(52) U.S. Cl.
CPC ............. *G06F 16/22* (2019.01); *G01G 17/00* (2013.01); *G01G 23/18* (2013.01); *G06F 16/51* (2019.01); *G06F 16/61* (2019.01); *G10L 15/22* (2013.01); *H04W 4/80* (2018.02)

(58) Field of Classification Search
CPC .......... G06F 16/22; G06F 16/51; G06F 16/61; G01G 17/00; G01G 23/18–44; G10L 15/22; H04W 4/80
USPC ........................................................ 707/741
See application file for complete search history.

(56) References Cited

U.S. PATENT DOCUMENTS

| | | | |
|---|---|---|---|
| 2013/0030873 A1* | 1/2013 | Davidson .............. | H04W 4/021 |
| | | | 705/7.36 |
| 2017/0064507 A1* | 3/2017 | Lineberry ............. | H04W 4/023 |

FOREIGN PATENT DOCUMENTS

WO   WO-2020073135 A1 *   4/2020   ........... G06Q 10/087

OTHER PUBLICATIONS

Citation 1: Instagram Article Titled: gowayfast. Wayfast Fast AF compliance, www.gowayfast.com, (@gowayfast), retrieved from the Internet on May 12, 2021 and May 13, 2021, https://instagram.com/gowayfast?gshid=1ur49jgaldwyy, 22 pages.

Citation 2: Calderon, Andrew, COO, Wayfast, Canix Expands Cannabis Cultivation Tools Through Partnership with Leading Hardware Compliance Provider, WayFast, CISION PR Newswire, https://www.prnewswire.com/news-releases/canix-expands-cannabis-cultivation-tools-through-partnership-with-leading-hardware-compliance-provider-wayfast-301277691.html, Apr. 27, 2021, 4 pages.

Citation 3: Canix, Cannabis Software—Seed to Sale—Cannabis ERP, retrieved from the Internet on May 13, 2021, https://www.canix.com, 6 pages.

Citation 4: Canix, RFID & Mobile Barcode Scanning, retrieved from the Internet on May 13, 2021, https://www.canix.com/products/scanning-and-rfid, 5 pages.

(Continued)

*Primary Examiner* — Hemant S Patel

(74) *Attorney, Agent, or Firm* — Dilworth IP, LLC

(57) ABSTRACT

A system and method for collecting information related to harvesting, or processing, of *cannabis* plants. A mobile device scans a tag associated with a plant and determines a unique code from the scan. A scale weighs the plant and transmits the weight to the mobile device. The mobile device stores the weight in association with the unique code in a database. The system automatically advances to a next plant for processing without user intervention.

22 Claims, 4 Drawing Sheets

(56) References Cited

OTHER PUBLICATIONS

Citation 5: Cannabis Manufacturing and Processing Software, retrieved from the Internet on May 13, 2021, https://www.canix.com/products/manufacturing-workflows, 4 pages.

Citation 6: GeoShepard—METRC Automated, retrieved from the Internet on May 13, 2021, https://geoshepard.com, 12 pages.

Citation 7: GeoShepard—GeoShepard Instructional videos, GeoScale Menu, Harvest Module, retrieved from the Internet on May 13, 2021, https://geoshepard.com/instructional-videos, 9 pages.

Citation 8: Metre LLC, Supporting the Will to Regulate, Government's trusted cannabis legalization partner, retrieved from the Internet on May 13, 2021, https://www.metrc.com, 4 pages.

* cited by examiner

TOUCHLESS HARVESTING SYSTEM AND METHOD

FIELD OF THE INVENTION

The present disclosure relates to harvesting plants, and more particularly, to a touchless system and method for collecting and storing information related to the harvest of plants.

BACKGROUND

In the regulated *cannabis* industry, a *cannabis* cultivator, or grower, may be required to label *cannabis* plants individually. A cultivator may also be required to harvest plants individually, recording the weight of each plant discretely. Satisfying these requirements may result in significant labor and equipment expenses for the cultivator.

The trichomes of some *cannabis* plants can be sticky, which may cause harvesting equipment and personnel to become sticky. For example, harvesting practices that involve manual data entry into a mobile system may necessitate excessive cleaning or early replacement of equipment. This can also increase labor and equipment expenses.

Presently, there are systems available that allow a cultivator to scan a physical or electronic tag associated with a *cannabis* plant using a mobile device. Information or data associated with a tag may include plant identification number, application identifier (medical or recreational use), tag order date, license number, facility name, plant weight, plant waste, and plant movement, transfer, or destruction. Some, all, or additional related information may be referred to herein as "harvest information," and the collection, storage, transmission, and/or use of harvest information of a plant may be referred to as "processing."

Some current systems seek to streamline or automate the process of collecting harvest information and/or integrating harvest information into management databases or regulatory compliance systems.

The "Canix Automate" software by Canix enables various mobile devices to scan plant tags and collect certain harvest data. Canix Automate purportedly enables the mobile device to record plant and package weights through a wireless interface with a Bluetooth-enabled weighing scale. Canix Automate can purportedly integrate the scanned harvest information with a regulatory compliance system, for example with the Marijuana Enforcement Tracking Reporting Compliance (METRC) system. See https://www.canix.com/.

The "GeoShepard Automation Solution" by GeoShepard produces a suite of applications to allow cultivators to automate both the collection of certain harvest information and the publication of such information into a regulatory compliance system, for example METRC. With "GeoScale," a cultivator can purportedly use a smartphone application to scan certain harvest information and capture scale weight from a wireless-enabled scale. With "GeoTrack," a cultivator can purportedly use a smartphone to track changes in the growth phase, movement, and destruction of plants. See https://geoshepard.com/.

While the above-described systems may streamline some aspects of harvesting processes, they have several limitations. Notably, these systems may require the user, or operator, to perform excessive, repetitive, or redundant operations. For example, when a user of a scanning device (e.g., a smartphone) finishes processing a first plant and wants to process a second plant, he may be required to use a touch interface to manually advance the system to scan the second plant. However, using a touch interface may be difficult, for example if the operator is covered in sticky trichomes, he is wearing gloves, or his hands are full. Further, using a touch interface may be inefficient, for example, if the user is under time pressure or is required to scan plants in a predetermined or preprogrammed order.

There is a need in the art for improved systems and methods for harvesting and processing *cannabis* plants.

SUMMARY

Embodiments described herein provide improved systems and methods for collecting harvest information for *cannabis* plants. In some embodiments, certain aspects of scanning tags associated with a single *cannabis* plant are automated. In some embodiments, certain aspects of scanning tags associated with multiple *cannabis* plants in a crop or facility are automated. Scanning may comprise optical reading or imaging of a barcode on a physical tag, wirelessly interfacing with a radio-frequency (RF) tag, or electrically coupling to an electronic tag.

Some embodiments include software executing on a processor, such as in a mobile phone or device. Using the software, a user can scan a plant tag with a barcode scanner, a camera on a mobile device, or an RF scanner (transceiver) connected to a mobile device or computer. The device may interface with a scale through a wireless or wired interface via wired or wireless protocols, such as WiFi, Bluetooth, near-field communication (NFC), Ethernet, or universal serial bus (USB). The scale determines if a weight is currently sensed, and if so, records the weight of the plant that was scanned proximally in time or location. This has an advantage of reducing the time needed to collect harvest information for a given plant.

In some embodiments, once the scale records the weight, the software will automatically return to tag-scanning mode to approximately repeat the process for a next plant. This has an advantage of reducing the time needed to process multiple plants. A further advantage is to minimize user-interactions with a touchscreen or buttons of the device while collecting harvest information.

In some embodiments, a user can specify a time delay between plant scans to allow sufficient time to retrieve another plant for processing. Alternatively, rather than a time delay, a state of the scale can be used to determine when to advance to the next plant for processing. For example, a determination to advance may be based on whether the scale reports a weight that is within a predetermined expected range for that plant at that time.

One exemplary embodiment comprises a method performed by a mobile device of processing information associated with a plant. The mobile device obtains a first scan of a first tag, associated with a first plant via a peripheral, and the mobile device obtains a first weight measured by a scale. Obtaining the weight may comprise the mobile device receiving a wireless transmission from the scale; receiving a wireless transmission from a network in communication with the scale; capturing an image of a readout of the scale; receiving an audio message from the scale indicating the first weight; or receiving a voice command from a person. A first unique code is identified from the first scan, and the first weight is stored in association with the first unique code in a database. The mobile device transitions to the processing of information associated with a second plant in response to detecting a signal trigger.

Another exemplary embodiment comprises a system of processing information associated with a plant that includes a scale, a database, and a mobile device. The mobile device includes a peripheral and computer-readable instructions stored in a non-transitory storage medium, where the computer-readable instructions execute on the mobile device to perform several steps. Execution of the instructions causes the mobile device to obtain a first scan of a first tag, associated with a first plant via the peripheral, and to obtain a first weight measured by a scale. A first unique code is identified from the first scan, and the first weight is stored in association with the first unique code in a database. Execution of the instructions causes the mobile device to transition to the processing of information associated with a second plant in response to detecting a signal trigger.

While the embodiments are particularly useful in the regulated *cannabis* industry, their applications are not limited thereto.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions, or parameters described and/or shown herein, and that the terminology used herein is for the purpose of describing embodiments by way of example only and is not intended to be limiting of the claimed embodiments.

Also, as used in the specification and the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

The following numerals are used to describe various features of the embodiments;
100 mobile device;
110 peripheral;
130 software;
140 display;
200 scale;
210 network interface;
300 plant;
310 tag;
320 unique code;
400 backend service.

Figure 1A:
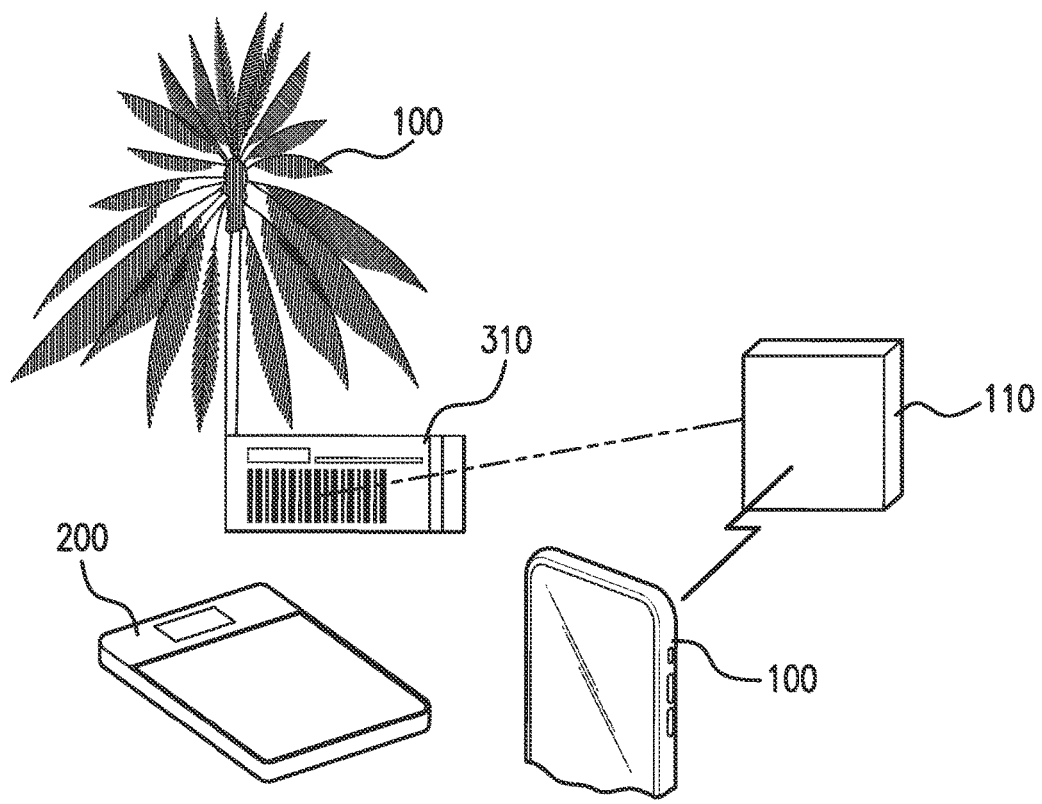
FIG. 1A illustrates an environment or facility comprising a mobile device, a scale, and a tagged plant.

FIG. 1A shows an exemplary embodiment of a system for collecting, storing, and/or using harvesting information of *cannabis* plants generally comprising a mobile device 100, a scale 200, and a plant 300.

The mobile device 100 comprises software 130, a non-transitory storage medium storing the software 130, a peripheral 110, and a display 140. The software 130 executes on the mobile device 100 (e.g., via processor the mobile device 100), which causes the display 140 and peripheral 110 to perform certain functions (as described below). The display 140 may be a touchscreen. The peripheral 110 may be, for example, an optical or infrared camera, a wireless transceiver, or a combination thereof. Examples of general wireless-transceiver protocols include radio-frequency identifier (RFID), near-field communication (NFC), and Bluetooth. The mobile device 100 may be any electronic device adapted as described above, for example a smartphone, tablet, computer, or robot, whether the electronic device is physically tethered at a fixed location or capable of untethered operation. In some embodiments, a stand-alone RFID scanner may be used instead or in addition to the mobile device 100, where the stand-alone RFID scanner may be physically tethered at a fixed location or capable of untethered (mobile) operation.

Functions performed by the display 140 may include: displaying a weight of a plant 300; displaying a unique code 320 encoded in or on a tag 310; displaying a status of a peripheral 110; displaying a status of information processing; and displaying any other information, content, images, videos, or visualizations relevant to collecting and storing information relevant to the harvest of plants. Additional functions performed by the display 140 may include: prompting an operator for action or input; and accepting input from an operator.

Functions performed by the peripheral 110 may include: capturing a photograph or recording a video; scanning a graphical barcode; scanning for an RFID-based tag 310; interfacing with a wirelessly enabled tag 310; and reading data from (or writing data to) a wirelessly enabled tag.

The scale 200 is any device suitable for measuring or detecting one or more physical properties of a plant 300. In one embodiment, the scale 200 is any device suitable for weighing, or measuring the mass of, a plant 300. The scale 200 may have a network interface 210 for communication with a network, for example a wired Ethernet network, a wireless WiFi network, or a cellular broadband network.

Figure 1B:
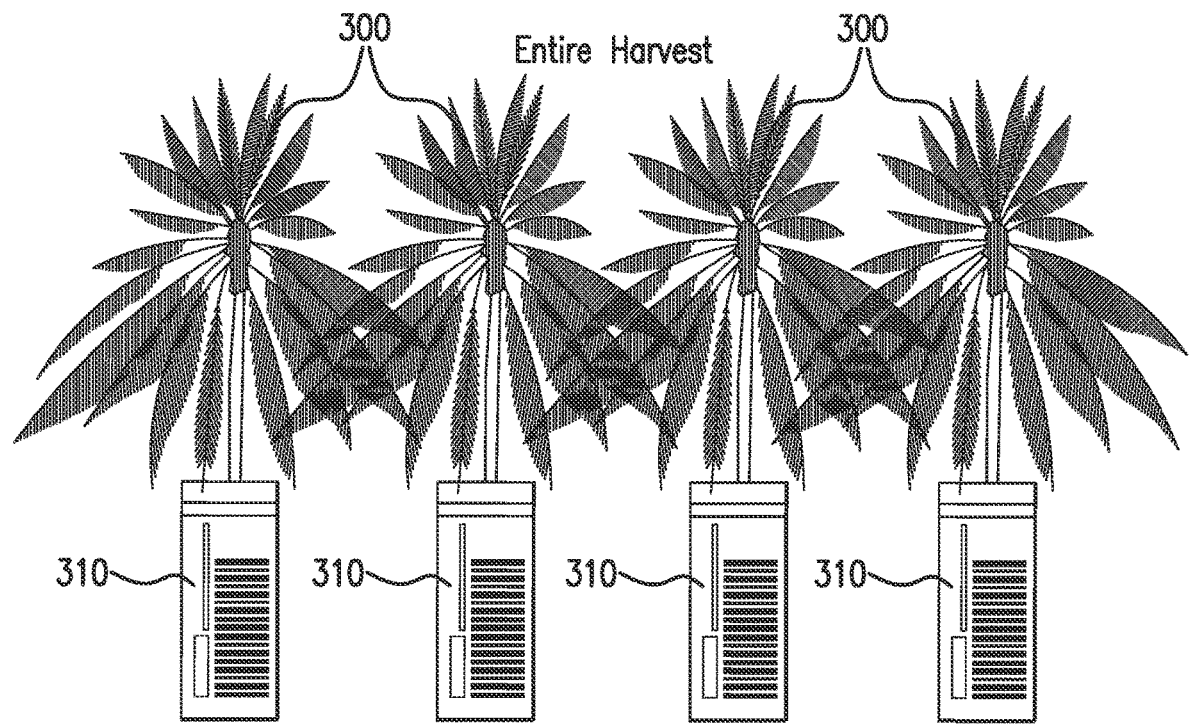
FIG. 1B illustrates an environment or facility comprising multiple tagged plants.

The plant 300 is any plant, for example a *cannabis* plant, intended to be weighed on the scale 200. The plant 300 may be associated with one or more tags 310. As shown in FIG. 1B, a facility may house many plants 300, each of which may be associated with one or more tags 310. A tag 310 may be physically attached to a plant 300, embedded on or in a plant 300, or located in proximity to a plant 300. A tag 310 may be made of paper, plastic, metal, semiconductor, organic, or any other suitable material.

Each tag 310 displays, encodes, and/or stores a unique code 320. The unique code 320 may be an alphanumeric identifier. In the case of a simple paper tag 310, the unique code 320 may, for example, be directly displayed on the tag 310 or encoded in a barcode displayed on the tag 310. In the case of an RF tag 310, the unique code 320 may, for example, be stored and/or encoded within a semiconductor microchip, for example in non-volatile random-access memory (NV-RAM) or read-only memory (ROM). The unique code 320 may, for example, be a company- or facility-specific plant identifier or a Marijuana Enforcement Tracking Reporting Compliance (METRC) unique identifier (UID).

Figures 2A, 2B:
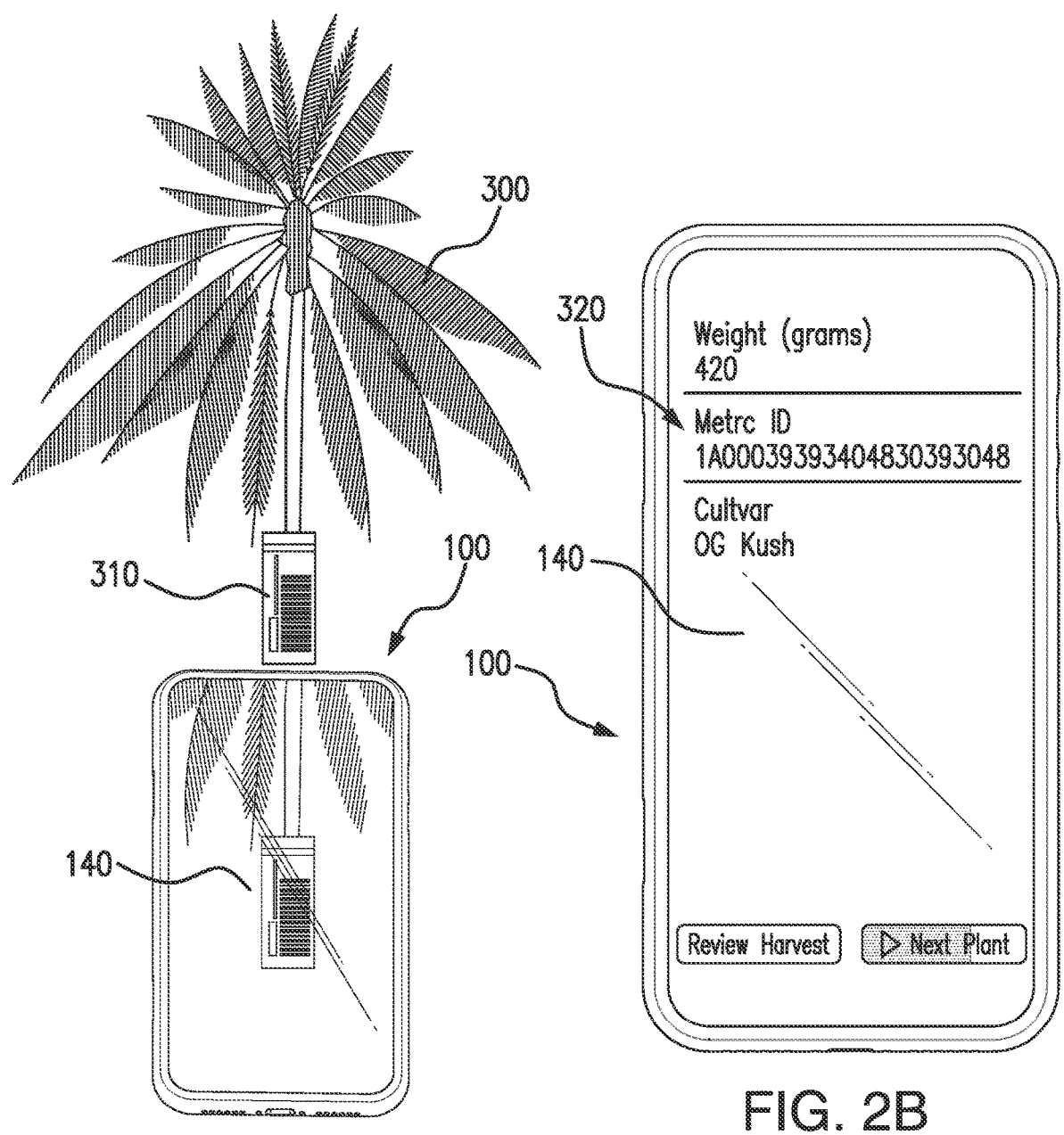
FIGS. 2A-2B illustrate exemplary user interfaces of a system according to an exemplary embodiment.

FIG. 2A shows an exemplary user interface visible on the display 140 of a mobile device 100. A user presents a tag 310 to a peripheral 110 of the mobile device 100. In this exemplary embodiment, the peripheral 110 is an optical camera. The peripheral 110 scans (or captures an image of) the tag 310 and sends the image to the software 130 executing on the mobile device 100. In this exemplary embodiment, the tag 310 comprises a barcode that encodes a unique code 320. The software 130 executes to recognize, determine, or decode the unique code 320 encoded by the barcode. In some embodiments, the peripheral 110 may assist in performing the operation of recognizing, determining, or decoding the unique code 320 in cooperation with the software 130, or the peripheral may fully perform such operation.

In some embodiments, the tag 310 may be an RF tag. In such embodiments, the peripheral 110 may be an RFID scanner or an NFC transceiver. The peripheral 110 scans, polls, queries, pings, or otherwise communicates with a tag 310. Herein the term "scanning" may refer alternatively or collectively to the aforementioned peripheral operations. An RF tag is generally scannable within a predetermined distance of a compatible RF scanner. For example, some common NFC tags are scannable up to several centimeters; some common RFID tags are scannable at up to several meters; and some common Bluetooth tags are scannable up to several tens of meters.

FIG. 2B shows another exemplary user interface visible on the display 140 of a mobile device 100 shortly after a peripheral 110 has scanned a tag 310. Examples of harvest information are shown near the top of the display 140, here a plant weight, unique code 320 (plant identifier), and plant cultivar. Two buttons (e.g., soft buttons) are displayed near the bottom of the display 140, the left button providing a means for a user to review certain harvest information and the right button providing a means to advance the system to perform a scan of a next plant 300. In preferred embodiments, the system automatically advances to perform a scan of the next plant 300, so that the right button may function as a manual backup. In some embodiments, the right button may be omitted.

In some embodiments, a status indicator may be displayed to indicate to a user an amount of time remaining before the system automatically advances to perform a scan of a next plant 300. For example, the status indicator may comprise a colored or shaded bar that recedes from left to right (as shown in FIG. 2B within the "next plant" button), or the status indicator may comprise a colored or shaded bar, circle, or ring that recedes or moves in any direction. The status indicator may additionally or alternatively fade out or fade to a different color. The status indicator may additionally or alternatively comprise a numeric countdown or count-up value, an animated hourglass, an animated stopwatch, or any static or dynamic means to indicate remaining time.

In some embodiments, a user can configure the system to automatically advance or transition to a second (next) plant 300 upon completion of processing of a first plant 300. In some embodiments, the user or the system can configure a time delay between completion of processing the first plant 300 and advancing to the second plant 300. In some embodiments, the time delay can be a fixed duration or a variable duration based in one or more variables and/or parameters. For example, the system may configure and/or adapt the time delay based on user work patterns, required work speed, workplace configuration, plant locations, time of day, season, and so on.

In some embodiments, a user can configure the system to wait for and/or detect a signal trigger to advance to a second (next) plant 300 upon completion of processing of a first plant 300. In some embodiments, the system may advance upon the following: detecting expiry of a user-configurable timer; detecting a predetermined voice command by a microphone; detecting a predetermined hand gesture by an optical or infrared sensor; detecting a predetermined motion, orientation, or position of the mobile device 100 by an inertial measurement unit (IMU); detecting a predetermined motion, orientation, or position of an operator of the mobile device 100 by a sensor; detecting a predetermined motion, orientation, or position of an electronic device worn by an operator of the mobile device 100; detecting a predetermined motion, orientation, or position of an RFID tag associated with an operator of the mobile device 100; obtaining a change in location of the mobile device 100; obtaining a change in location of an operator of the mobile device 100; obtaining a change in state of the scale 200; obtaining a second scan of a second tag 310, associated with a second plant 300, via the peripheral 110; and/or obtaining a second weight measured by the scale 200. An IMU may comprise an accelerometer, gyroscope, and/or a magnetometer. A mobile device 100 may also use global positioning system (GPS) to determine or assist in determining a position of the mobile device 100.

In some embodiments, a user of the mobile device 100 may wear an electronic device that is capable of being detected or scanned by the mobile device 100, for example an RFID or NFC wristband, a smart wristwatch, or a smart ring. When the user reaches towards a scale 200 to place a plant 300 thereon or remove a plant 300 therefrom, the mobile device 100 may detect or obtain a change in motion, orientation, or position of the body-worn electronic device. Based on the motion orientation, or position of the body-worn electronic device, the mobile device 100 may be triggered to advance to a second (next) plant 300. The meaning of "body worn electronic device" includes attaching the electronic device to clothing or accessories worn by a user or placing the electronic device in a pocket of clothing or accessories worn by a user.

In some embodiments, the signal trigger may be transmitted by a scale 200 adapted to communicate with a wired or wireless network. The mobile device 100 may receive such a signal trigger directly from the scale 200 or via one or more networks in communication with the scale 200. In some embodiments, for example if the scale 200 cannot communicate with a wired or wireless network, the software 130 of the mobile device 100 may instruct the mobile device 100 to take a picture (capture an image) of a visible display of the scale 200 which displays a weight of a plant 300 placed on or hung from the scale 200. The software 130 performs character recognition on the captured image to determine the weight displayed by the scale 200. In such embodiments, the signal trigger may be a determination by the software 130 of successful character recognition.

When advancing to the next plant in response to a signal trigger (including expiry of a timer), the process described above approximately repeats for the next plant 300. In some embodiments, the software 130 of the mobile device 100 may configure and/or use a second (different) peripheral 110 to scan a second tag 310 to process the second plant 300. For example, if the first tag 310 displays a barcode, the mobile device 100 may use a camera (first peripheral 110) to scan the first tag 310. Then, if the second tag 310 is an RFID tag, the mobile device 100 may use an RFID-scanner (second peripheral 110) to scan the second tag 310.

Figure 3:
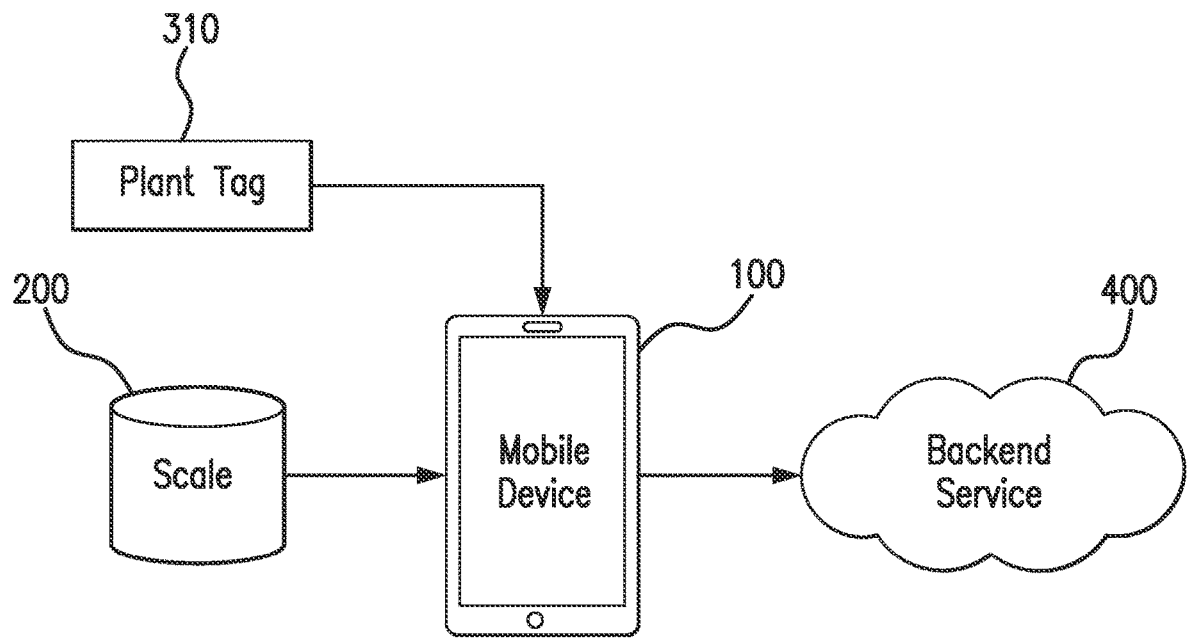
FIG. 3 illustrates a method according to an exemplary embodiment where a mobile device uses a camera peripheral to scan a plant tag.

FIG. 3 shows an exemplary embodiment where a tag 310 associated with a plant 300 is presented to a mobile device 100 mounted on a stand. The mobile device 100 has a peripheral 110 which is a camera, and the tag 310 is placed within the field of view of the camera lens. The peripheral 110 automatically scans, or images, the tag 310 without the user having to touch or position the mobile device 100. The mobile device 100, in cooperation with the software 130, determines a unique code 320 of the tag 310.

The user then places the plant 300 on a communications-enabled scale 200. The scale 200 transmits one or more weights to the mobile device 100. In some embodiments the scale 200 transmits a single weight after the scale 200 has stabilized its weight measurement. In some embodiments the scale 200 transmits weights periodically or continuously while its weight measurement is stabilizing. In the latter embodiments, the software 130 of the mobile device 100 may determine the weight of a plant 300 as a function of a plurality of weights received, for example a weighted average of the weights received within a predetermined time window. Alternatively, the software 130 may determine the weight of a plant 300 as the first weight received after a predetermined delay, for example the first weight received two seconds after receiving a first non-zero (non-tared) weight from the scale 200.

In some embodiments the scale 200 transmits a signal trigger (e.g., including one or more weights) after the scale 200 determines that a plant 300 has been removed from the scale 200. In some embodiments the scale 200 transmits a signal trigger and/or one or more weights based on a relative change in location between: the mobile device 100 and the scale 200; the mobile device 100 and the last-scanned tag 310; or the scale 200 and the last-scanned tag 310. For example, the scale 200 transmits a signal trigger and/or one or more weights when the mobile device 100 is carried away from the scale 200 by a predetermined distance. Systems and methods to determine relative distance or relative changes in distance between RF-communications enabled devices or objects are known in the art, for example by signal strength, GPS, or dead-reckoning.

After the mobile device 100 receives or determines the weight of the plant 300, the mobile device 100 reports the weight to a backend service 400. The backend service 400 may comprise a local or cloud-based server, a database, an application, a blockchain, or a compliance regulatory system. The mobile device 100 may associate the reported weight with other harvest information, for example a proprietary plant identifier or the unique code 320.

Figure 4:
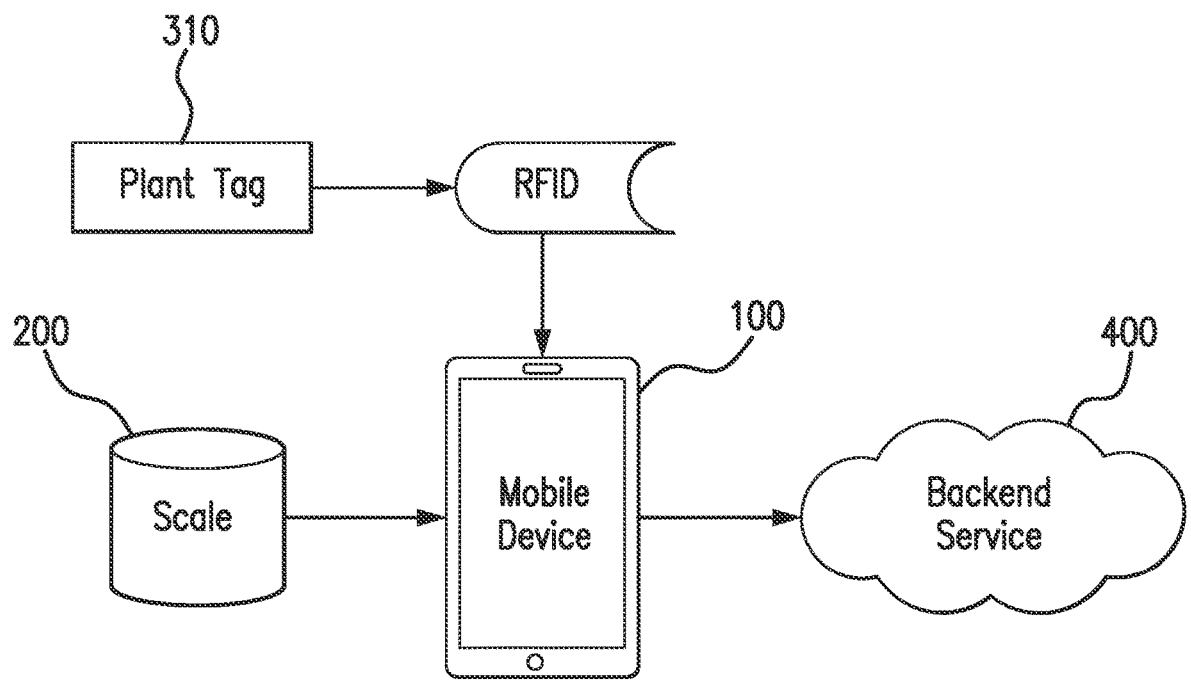
FIG. 4 illustrates a method according to an exemplary embodiment where a stand-alone RFID scanner scans a plant tag and transmits scan information to a mobile device.

FIG. 4 shows an exemplary embodiment where a tag 310 associated with a plant 300 is brought into relative proximity to a stand-alone RFID scanner. The RFID scanner automatically scans, or reads, the tag 310 without the user having to touch or position the RFID scanner. The RFID scanner transmits information obtained from the scan to a mobile device 100, without the user having to touch or position the mobile device 100. The RFID scanner and the mobile device 100 are adapted to communicate directly or through one or more networks, where such communication may be unidirectional or bidirectional. For example, the RFID scanner and the mobile device 100 may communicate via Bluetooth, WiFi, Ethernet, or USB.

The plant 300 is subsequently placed on or hung from a communications-enabled scale 200. The scale 200 transmits one or more weights to the mobile device 100. The mobile device 100 determines the weight of the plant 300 using any of the previously described methods. Subsequently, the mobile device 100 reports the weight to a backend service 400 as previously described.

Figure 5:
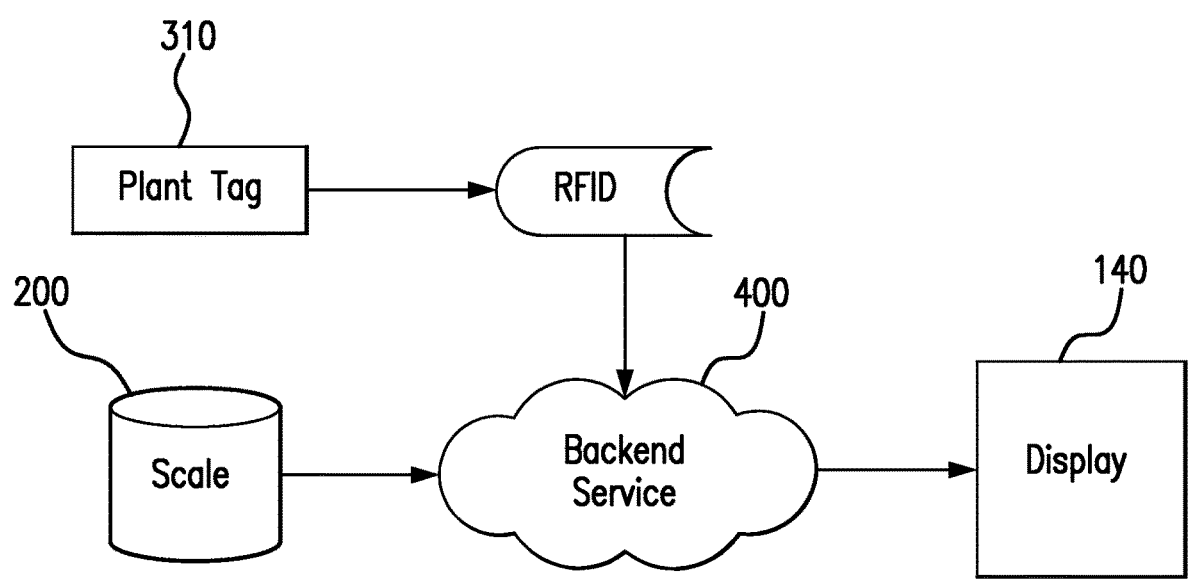
FIG. 5 illustrates a method according to an exemplary embodiment where a stand-alone RFID scanner device scans a plant tag and transmits scan information to a backend service.

FIG. 5 shows an exemplary embodiment where a tag 310 associated with a plant 300 is brought into relative proximity to a stand-alone RFID scanner. The RFID scanner automatically scans, or reads, the tag 310 without the user having to touch or position the RFID scanner. The RFID scanner transmits information obtained from the scan to a backend service 400 as previously described. The RFID may perform such transmission in communication with a wired or wireless network. The networks may comprise, for example, an intranet or the Internet.

The plant 300 is subsequently placed on or hung from a communications-enabled scale 200. The scale 200 transmits one or more weights to the backend service 400. Alternatively, or additionally, the scale 200 may transmit the one or more weights to a mobile device 100, which in turn may transmit the one or more weights (or a plant weight determined therefrom) to the backend service 400 as previously described.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A method performed by a mobile device of processing information associated with a plant, comprising the steps of:
   obtaining a first scan of a first tag, associated with a first plant, via a peripheral of the mobile device;
   obtaining a first weight measured by a scale;
   identifying a first unique code from the first scan;
   storing the first weight in association with the first unique code in a database; and
   transitioning to a processing of information associated with a second plant responsive to detecting a signal trigger, wherein the signal trigger comprises at least one of:
   detecting a predetermined motion, orientation, or position of an electronic device worn by an operator of the mobile device;
   detecting a predetermined motion, orientation, or position of an RFID tag associated with the operator of the mobile device; and
   obtaining a change in state of the scale.

2. The method of claim 1, wherein the peripheral comprises one of:
   a camera; and a near-field communication (NFC) transceiver.

3. The method of claim 1, wherein obtaining the first weight comprises one or more of:
 receiving a wireless transmission from the scale indicating the first weight;
 receiving a wireless transmission from a network in communication with the scale indicating the first weight;
 capturing an image of a readout of the scale indicating the first weight;
 receiving an audio message from the scale indicating the first weight; and
 receiving a voice command from a person indicating the first weight.

4. The method of claim 1, wherein detecting the signal trigger further comprises one or more of:
 detecting an expiry of a user-configurable timer;
 detecting a predetermined voice command by a microphone;
 detecting a predetermined hand gesture by an optical or infrared sensor;
 detecting a predetermined motion, orientation, or position of the mobile device by an inertial measurement unit (IMU);
 detecting a predetermined motion, orientation, or position of the operator of the mobile device by a sensor;
 obtaining a change in location of the mobile device;
 obtaining a change in location of the operator of the mobile device;
 obtaining a second scan of a second tag, associated with a second plant, via the peripheral; and
 obtaining a second weight measured by the scale.

5. The method of claim 1, wherein detecting the signal trigger further comprises detecting an expiry of a user-configurable timer.

6. The method of claim 1, wherein detecting the signal trigger further comprises obtaining a second scan of a second tag, associated with a second plant, via the peripheral.

7. The method of claim 1, wherein detecting the signal trigger further comprises obtaining a second weight measured by the scale.

8. The method of claim 1, wherein the processing of information associated with the second plant comprises one or more of:
 obtaining a second scan of a second tag, associated with a second plant, via the peripheral;
 obtaining a second weight measured by the scale;
 identifying a second unique code from the second scan; and
 storing the second weight in association with the second unique code in the database.

9. The method of claim 1, wherein detecting the signal trigger further comprises detecting a predetermined voice command by a microphone.

10. The method of claim 1, wherein detecting the signal trigger further comprises obtaining a change in location of the mobile device.

11. The method of claim 1, wherein detecting the signal trigger further comprises detecting a predetermined motion, orientation, or position of the mobile device by an inertial measurement unit (IMU).

12. A system of processing information associated with a plant, comprising:
 a scale;
 a database; and
 a mobile device, including a peripheral and computer-readable instructions stored in a non-transitory storage medium, wherein the computer-readable instructions execute on the mobile device to:
  obtain a first scan of a first tag, associated with a first plant, via the peripheral;
  obtain a first weight measured by the scale;
  identify a first unique code from the first scan;
  store the first weight in association with the first unique code in the database; and
  transition to a processing of information associated with a second plant responsive to detecting a signal trigger, wherein the signal trigger comprises at least one of:
   detecting a predetermined motion, orientation, or position of an electronic device worn by an operator of the mobile device;
   detecting a predetermined motion, orientation, or position of an RFID tag associated with the operator of the mobile device; and
   detecting the signal trigger comprises obtaining a change in state of the scale.

13. The system of claim 12, wherein the peripheral comprises one of:
 a camera; and
 a near-field communication (NFC) transceiver.

14. The system of claim 12, wherein to obtain the first weight comprises one or more of:
 to receive, by the mobile device, a wireless transmission from the scale indicating the first weight;
 to receive, by the mobile device, a wireless transmission from a network in communication with the scale indicating the first weight;
 to capture, by the mobile device, an image of a readout of the scale indicating the first weight;
 to receive, by the mobile device, an audio message from the scale indicating the first weight; and
 to receive, by the mobile device, a voice command from a person indicating the first weight.

15. The system of claim 12, wherein detecting the signal trigger further comprises one or more of:
 detecting an expiry of a user-configurable timer;
 detecting a predetermined voice command by a microphone;
 detecting a predetermined hand gesture by an optical or infrared sensor;
 detecting a predetermined motion, orientation, or position of the mobile device by an inertial measurement unit (IMU);
 detecting a predetermined motion, orientation, or position of the operator of the mobile device by a sensor;
 obtaining a change in location of the mobile device;
 obtaining a change in location of the operator of the mobile device;
 obtaining a second scan of a second tag, associated with a second plant, via the peripheral; and
 obtaining a second weight measured by the scale.

16. The system of claim 12, wherein detecting the signal trigger further comprises detecting an expiry of a user-configurable timer.

17. The system of claim 12, wherein detecting the signal trigger further comprises obtaining a second scan of a second tag, associated with a second plant, via the peripheral.

18. The system of claim 12, wherein detecting the signal trigger further comprises obtaining a second weight measured by the scale.

19. The system of claim 12, wherein the processing of information associated with the second plant comprises one or more of:
- obtaining a second scan of a second tag, associated with the second plant, via the peripheral;
- obtaining, by the mobile device, a second weight measured by the scale;
- identifying, by the mobile device, a second unique code from the second scan; and
- storing, by the mobile device, the second weight in association with the second unique code in the database.

20. The system of claim 12, wherein detecting the signal trigger further comprises detecting a predetermined voice command by a microphone.

21. The system of claim 12, wherein detecting the signal trigger further comprises obtaining a change in location of the mobile device.

22. The system of claim 12, wherein detecting the signal trigger further comprises detecting a predetermined motion, orientation, or position of the mobile device by an inertial measurement unit (IMU).

* * * * *